Jan. 1, 1963     A. H. HAMILTON     3,071,111

LIQUID APPLICATOR FOR LIVESTOCK

Filed Feb. 21, 1961

INVENTOR.
Alvah H. Hamilton
BY Thos. E. Scofield
ATTORNEY.

United States Patent Office 3,071,111
Patented Jan. 1, 1963

3,071,111
LIQUID APPLICATOR FOR LIVESTOCK
Alvah H. Hamilton, Ellsworth, Nebr.
Filed Feb. 21, 1961, Ser. No. 90,777
8 Claims. (Cl. 119—157)

This invention relates to liquid applicators for livestock, principally cattle, and refers more particularly to an applicator of the type adapted to supply liquid from a storage reservoir to structure accessible to the animal only upon displacement of apparatus by an animal contacting same.

One of the principal objects of the invention is to provide a liquid applicator of the character described which is extremely simple to construct and which eliminates the pump, special bearings and other components of special manufacture which are included in and form a necessary part of most of the applicators of this type of which I am presently aware. It is a singular and distinctive feature of my invention that controlled dispensing of liquid from the reservoir is achieved without requiring pumps or valves, and without any danger of continuous unchecked flow from the reservoir when the unit is not in use.

Still another object of the invention is to provide a liquid applicator of the character described in which the dispensing is accomplished by gravity feed, but which is so constructed that flow from the container is effectively checked and controlled during activation of the unit by the animal in order to prevent continuous and wasteful dispensing during such activation.

A further object of the invention is to provide an applicator which includes animal contacting applicator means of substantial width and which serves to deliver liquid to said applicator means at or near the location which has last been contacted by the animal in order to remedy the depletion of liquid therefrom occurring during such contact.

Yet another object of the invention is to provide an applicator of the character described which is low in cost, can be constructed from readily available components and which will withstand years of rugged use with a minimum of maintenance.

Other and further objects of the invention together with the features of novelty appurtenant thereto will appear in the course of the following description.

In the acompanying drawings which form a part of the specification and are to be read in conjunction therewith, and in which like reference numerals indicate like parts in the various views.

Figure 1:
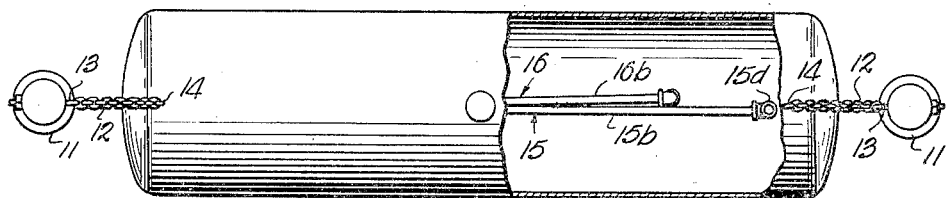
FIG. 1 is a top plan view of a preferred embodiment of the invention, part of the reservoir tank being broken away for purposes of illustration.

Referring to the drawings, the main body of the preferred unit comprises an elongate liquid tight container or tank 10 having a filler neck 10a and cap 10b. Preferably the tank is cylindrical, athough as will subsequently appear, the exact shape of the tank is not critical. The tank is suspended with its long axis horizontal from and between a pair of spaced uprights 11. The uprights 11 can conveniently be posts anchored at their lower ends in or to the ground (not shown). The space between the uprights is somewhat greater than the length of the tank whereby to permit of endwise movement of the tank therebetween.

The tank 10 is so connected with the uprights that it has a stabilized normal position with the long axis substantially horizontal yet is capable of rocking displacement from the horizontal responsive to upward pressures exerted against it on either side of its longitudinal center fo gravity. The suspension means in the preferred embodiment comprises the flexible chains 12 which are respectively connected at their upper ends with eye bolts 13 anchored in the uprights and at their lower ends with eyes or loops 14 affixed to the tank near the opposite ends of the latter. The connection points of the chains with the tank are located above the center of gravity so that the tank will have a normal rest position corresponding to the position shown in solid lines in FIG. 2, that is, with the long axis substantially horizontal or parallel with the ground and the ends spaced equally distant from the uprights 10.

Figure 4:
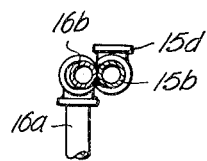
FIG. 4 is an enlarged fragmentary sectional view taken generally along the line 4—4 of FIG. 2 in the direction of the arrows.

Located in the interior of the tank 10 and running generally lengthwise thereof near the longitudinal center line are a pair of side-by-side liquid conducting conduits 15 and 16. The conduits illustrated are generally L-shaped in form, having the vertical legs 15a, 16a respectively, and the horizontal legs 15b, 16b. The vertical and horizontal legs of each conduit can conveniently be made of conventional lengths of pipe and connected with one another by elbows 15c, 16c. For the purpose of substantially rigidifying the conduits in the tank, the horizontal lengths 15b, 16b are connected with one another at longitudinally spaced points as, for example, by welds 17 (see FIGS. 1 and 4).

The vertical legs 15a, 16a extend through suitable apertures formed in the bottom of the tank and are sealed to the tank around the openings as by welding. The welded connection of the vertical legs with the tank wall, coupled with the connection between the horizontal legs, assures of a relatively rigid conduit assembly in which the conduits will be held in a substantially fixed position relative to the tank. The vertical legs terminate outside the tank in open outlet ends.

The free ends of the horizontal legs 15b, 16b terminate in upturned elbows 15d, 16d which present upwardly open inlet openings which, in the normal position of the tank, are located slightly above the elbows 15c, 16c, and the horizontal legs 15b, 16b. The inlet openings should respectively be located fairly close to the opposite ends of the tank, the reasons for which will presently be described.

Connected with the bottom of the tank and running lengthwise thereof is a trough-like member 17 having the closed ends 17a and 17b. In the preferred embodiment the member 17 comprises a length of angle iron to which partitions have been welded to form the ends 17a, 17b, and disposed with the apex downwardly and the edges in engagement with the tank. The trough is removably connected with the tank through the medium of a pair of downwardly projecting studs 18 welded or otherwise affixed to the tank near the ends of the tank and extending downwardly through registering apertures in the trough. The ends of the studs are threaded and nuts 19 serve to draw the trough into contact with and support the trough on the tank.

To provide for delivery of liquid from the trough-like member 17 to points accessible to the hide or skin of the animal I have utilized in the preferred embodiment of the invention a fibrous wicking 20 which conveniently can be formed of burlap sacking or the like. In the simplest approach individual sacks 21 are draped over the upper edges of the trough in overlapping relationship with the central portions of the sacks bunched in the trough to substantially fill same, and with the ends trailing freely below the trough. Obviously portions of the sacking are clamped between the edges of the trough and tank, thus serving to hold the sacks against separation from the unit.

In utilizing the unit, the tank is suspended above the ground at an elevation at which animals advancing thereon will be able with their backs to apply lifting pressure and cause substantial upward displacement of that portion in contact with the animal. Obviously an elevation based on the average height of the animal for whom it is intended will have to be selected. The tank is supplied with liquid L (which may be oil, oil mixed with insecticide or like medicaments known to the art), the liquid being limited to that which establishes the level S of the liquid below the level of the conduit intake opening when the tank is in the normal rest position. Ordinarily when first charged, enough liquid will be placed in the tank to bring the liquid level S to a point adjacent or just below the lifts of the intake openings. If the sacking is new, that is absent of any liquid, it may be desirable to add additional liquid which will flow through the conduits 15 and 16 into the trough and initially impregnate the wick material. Flow will stop, however, when the liquid level descends to the level of the intake openings.

In the operation of the unit and using cattle as an example, the animals are attracted to it as a result of their known propensity for desiring to rub against anything which will give relief from itching or irritations of the skin. Obviously, the lower surface of the tank and the sharp edged trough present an attractive surface. As the animal comes into contact with the unit and exerts upward or swinging pressure on it, the tank will be displaced from the normal rest position into an endwise tilted position. For purposes of illustration the arrow F of FIG. 2 represents an upward force causing elevation of the left end relative the right end, the displaced position being shown in broken lines.

Figure 2:
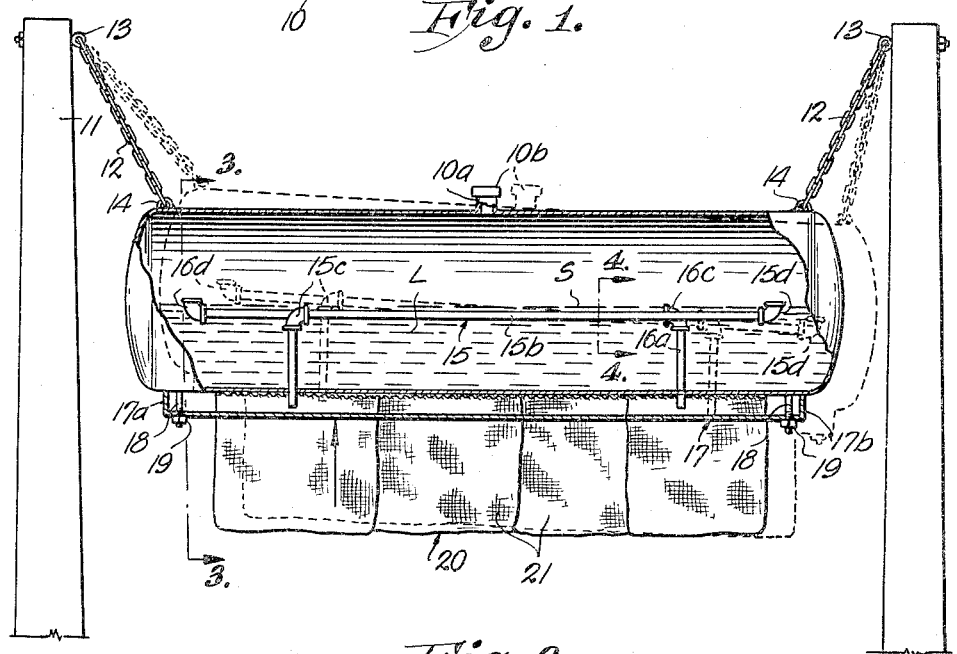
FIG. 2 is a side elevational view of the preferred embodiment, the reservoir tank again being broken away in part to show the interior thereof.
Figure 3:
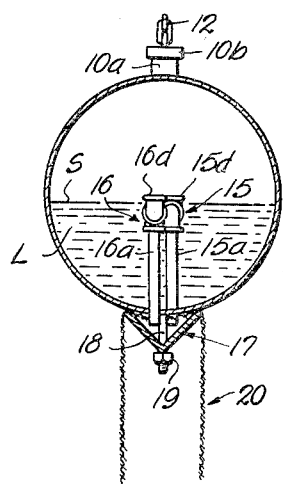
FIG. 3 is a sectional view taken generally along the line 3—3 of FIG. 2 in the direction of the arrows.

Since the liquid surface S tends to remain horizontal at all times, tilting of the tank has the effect of submerging the elbow 15d in the liquid and at the same time elevating the intermediate elbow 15c above the liquid, as shown respectively in broken lines in FIG. 2. Liquid will therefore enter the elongate portion 15d to the extent that that length of the conduit below the liquid level will be filled. Because of the relative elevation of a section of the elongate portion 15b above the liquid level, liquid will not enter the vertical leg 15a at this time.

When the force on the tank is removed, it will descend to the normal rest position or at least move therethrough. The liquid trapped in the intake elbow 15c and horizontal portion 15b will now flow by gravity into the vertical leg 15a and into the trough. It is taken up by the wicking material and by capillary attraction distributes to the depending portions thereof.

During the lifting of the left hand end, the conduit 16 remains inactive since its intake end is lifted relative to the liquid level and remains thereabove. Obviously if the force is applied to the right hand end and the tilt is opposite to that shown, then it is the conduit 16 which traps liquid and delivers it to the trough through leg 16a.

Nudging of the tank at the ends sufficient to set it swinging endwise will perhaps result in sufficient surging of the liquid and inclination of the tank as to cause intermittent charges of liquid to enter the conduits and be discharged into the trough. This is, of course, desirable, since the purpose of the device is to keep the wicking well impregnated without, however, permitting continuous flow from the reservoir.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In an animal operated liquid dispensing and applying device, the combination of a confined body of liquid normally at rest having an exposed horizontal surface with a space thereabove, a liquid conducting conduit having an intake opening normally disposed in said space and out of communication with said liquid and an outlet opening disposed below the level of said intake end and out of communication with said body, said conduit at all points being normally lower than said intake opening and having a portion thereof transverse to the vertical, means supporting said conduit in said normal position but operable to temporarily displace said conduit to a position wherein said intake opening is displaced downwardly and submerged in said liquid, said conduit further provided with a section between said portion and said outlet and so located relative to said intake opening that at any time when the intake opening is submerged, said section is located above the surface of the liquid whereby to prevent gravity flow to the outlet opening through said section until the conduit returns to the normal position.

2. The combination as in claim 1 wherein said last named means comprises a tiltable container for said liquid, said conduit being affixed to said container.

3. In an animal operated liquid dispensing and applying device, the combination of a container having a pair of opposed upright walls and containing a supply of liquid therein providing a level surface with a space thereabove, support means connected with said container and supporting same in a normal rest position, said support means so constructed and connected with said container as to permit displacement of said container from the rest position to a position wherein one of said walls is elevated relative to the other, a liquid conducting conduit connected with and supported by said container and having an intake opening which in the normal position of said container is disposed in said space and out of communication with said liquid but which upon said displacement becomes submerged in said liquid and an outlet opening disposed below the level of said intake opening and exteriorly of said container, said conduit being at all points lower than said intake opening when the container is in said normal position and having a portion thereof transverse to the vertical and extending generally in the direction of the separation of said opposed upright walls, said conduit further provided with a section between said portion and said outlet opening so located relative to said intake opening that at any time when the intake opening is submerged, said section is located above the surface of the liquid whereby to prevent gravity flow to the outlet opening through said section until the conduit returns to the normal position whereby to prevent continuous gravity flow of liquid through said conduit to the outlet opening when the container is displaced from said normal position.

4. The combination as in claim 3 wherein said outlet opening is spaced from said inlet opening in the direction of separation of said upright walls.

5. The combination as in claim 3 wherein said container comprises an elongate tank with its long axis generally horizontal, and said support means includes a pair of upright posts adjacent the opposite ends of the tank and flexible suspension means connecting the tank with said post.

6. In an animal operated liquid dispensing and applying device, the combination of a container having opposed end walls and containing a body of liquid, support means for said container including flexible suspension means at each end of the container and connected therewith to suspend same in a normal gravity stabilized position, and gravity feed liquid dispensing means secured to said container and movable therewith, said means including intake and outlet openings and an interconnecting conduit so located and constructed that upon elevation of one end relative to the other liquid is prevented from feeding to said outlet opening yet upon the subsequent return of the container to a normal position a quantity of liquid is trapped in said conduit and caused to flow through said outlet opening to a point exterior of the container.

7. The combination as in claim 6 wherein said liquid dispensing means operates to deliver a quantity of liquid upon elevation and subsequent return of either end relative to the other.

8. In an animal operated liquid dispensing and applying device, the combination of a container having opposed end walls and containing a body of liquid, support means for said container including flexible suspension means at each end of the container and connected therewith to suspend same in a normal gravity stabilized position, a liquid conducting conduit supported within and by said container and having an intake opening near one end of the container normally above the surface of said liquid and extending through the bottom of the container near the other end of the container and terminating in an outlet opening, said conduit normally at all points below the level of said intake opening and having a portion adapted to receive liquid from the container through said intake opening upon the elevation of said other end of the container relative said one end sufficiently to cause said intake opening to be submerged in said liquid, said conduit further provided with a section between said portion and said outlet opening and so located relative to said intake opening that at any time when the intake opening is submerged, said section is located above the surface of the liquid whereby to prevent gravity flow to the outlet opening through said section until the conduit returns to the normal position.

References Cited in the file of this patent
UNITED STATES PATENTS

| | | |
|---|---|---|
| 1,049,339 | Byer | Jan. 7, 1913 |
| 2,961,998 | Heese | Nov. 29, 1960 |
| 2,988,052 | Heese | June 13, 1961 |